3,255,262
NITRATION OF CYCLOHEXANE
John H. Bonfield, East Aurora, N.Y., assignor to Allied Chemical Corporation, New York, N.Y., a corporation of New York
No Drawing. Filed Sept. 28, 1964, Ser. No. 399,840
9 Claims. (Cl. 260—644)

This invention relates to an improvement of processes for the production of mononitrated cyclohexane by vapor phase nitration. Mononitrated cyclohexane is an important intermediate in the production of ε-caprolactam which is used to produce polycaproamide synthetic fibers and molding resins.

A number of processes are known for the mononitration of cyclohexane in the vapor phase, most of which are undesirable due to low rates of conversion and yields. Many deficiencies encountered in the prior art are considerably improved by the processes described in United States Letters Patents Nos. 3,133,123, and 3,133,124, issued to Allied Chemical Corporation. The process of the former application comprises pre-mixing cyclohexane with a nitrating agent at a temperature below that at which substantial nitration occurs and passing the mixture through a single-stage reaction zone under specific temperature conditions for limited residence times in the reactor, while the latter application is directed to multiple stage vapor phase nitration process wherein nitrating agent is added to the reaction mixture from a preceding stage before proceeding with the nitration in a following stage to improve conversion of cyclohexane per pass, and allow the use of more favorable nitrating agent to cyclohexane ratios than was possible in single-stage processes.

The yield approaches the theoretical as residence times within a reactor increase. Theoretically infinite reactor space, i.e. infinite residence time would result in theoretical yields. In practice, however, increased residence times result in unwanted side reactions, necessitating the use of reactors of prohibitive size, since by each 10 fold increase in reactor size only about a 10% improvement in yield could be accomplished.

Accordingly, it is an object of the present invention to provide an improved method for the vapor phase mononitration of cyclohexane whereby indefinitely long residence times are possible with resulting increased yields.

In accordance with the invention, it was found that extended residence times can be achieved with improved yield and great reactant concentration flexibility in either the single stage, or in multi-stage nitration processes for cyclohexane, by agitating the reaction mixture during the reaction, the degree of agitation being controlled so as to maintain the temperature gradient of the reaction mixture within a range of about 5° C., preferably within 1° C. and preferably about the optimum temperature for the reaction throughout the entire reaction zone in the reactor, or in each reactor if a multiple stage process is used. The most convenient way of agitating the reaction mixture to stay within the required temperature range is by subjecting the vapor phase mixture to a high degree of mixing and intense turbulence to achieve constant and rapid heat equalization between the various parts of the entire volume of the mixture in the reactor. This can be accomplished in spherical or tubular reactors in a known manner by high-speed rotary or reciprocating agitators, baffles, spargers, forced recirculation and the like. All functions of this type will be referred to hereinafter by the term intense agitation.

By conducting the nitration under intense agitation of the reaction mixture, indefinitely long residence times can be used without encountering substantial by-product formation and avoiding the need for reactors of increased size. As a result, the desired reaction proceeds more completely giving a higher yield of the desired product. Furthermore, by conducting the reaction under intense agitation, it was found that the optimum reaction temperature shifts to a lower value. Consequently, intense agitation of the reaction mixture brings about a further improvement in yield by thus also eliminating unwanted side reactions which occur at higher reaction temperatures. In the multiple stage process of United States Patent No. 3,133,124, the optimum temperature can be a different one in each reactor. Consequently, the maintainance of uniform temperature is not only a measure of suitable concentration homogenization by intense agitation, but also an end desired by itself.

It is to be understood that while one of the suitable nitrating agents is referred to herein as nitrogen dioxide, this compound is known to exist in equilibrium with $N_2O_4$, nitrogen tetroxide; therefore, it is to be understood that when referring herein to nitrogen dioxide, also nitrogen tetroxide and mixtures of nitrogen dioxide and nitrogen tetroxide are meant to be included. The stoichiometric ratios referred to herein are given for nitrogen dioxide, and have to be adjusted if some or all of the dioxide is substituted with the nitrogen tetroxide.

In the above-identified patents, the cyclohexane and the nitrating agent are pre-mixed at a relatively low temperature at which no substantial nitration occurs, preferably about 180° C., or lower, to avoid the production of localized explosive mixtures of cyclohexane and nitrating agent. Four or more mols cyclohexane are mixed with each mol nitric acid, or one or more mols cyclohexane are mixed with each mol nitrogen dioxide. These are considered explosion-safe minimum cyclohexane to nitrating agent ratios for single stage nitration processes. In a multiple step processes, an overall ratio of cyclohexane to nitrating agent, considerably lower than the safe ratio of the single stage process, can be used.

The nitration can be most effectively accomplished within the temperature range between 250° C. and 375° C., wherein the residence time is at least 20 seconds and the reaction mixture in the reaction zone, or in each zone, is kept in a state of intense agitation to maintain its entire volume within the preferred temperature range of 1° C. about the optimum reaction temperature. Further, if a multiple stage process is used, if for instance, inaccordance with the latter one of said patents, additional amounts of nitrating agent, preferably 0.8 to 1.2 mols thereof per mol of nitrating agent used in the first stage, are added between the stages, the temperature of the reaction mixtures in the various stages has to be kept within the required temperature limit about the optimum within each one of the reactors.

Upon exiting from the reactor, the condensible portion of the reaction product can be condensed, and unreacted cyclohexane separated therefrom, for instance, by fractional distillation. Nitrocyclohexane can be recovered from the residue, for instance, by distillation, conversion to its ammonium salt, etc.

In the reactors used for the process of the invention temperature monitoring devices should be disposed at various locations to enable an accurate control of the desired necessary narrow temperature range. Of course, the equipment used in the process of the invention should be resistant to corrosion by nitric acid; therefore, glass, glass-lined or acid-resistant stainless steel reactors, or reactors lined with such materials are preferred.

As disclosed in the above-identified patents, the addition of about 0.5 to 1 mol nitric oxide per mol nitrating agent to the reaction mixture was found to increase the mononitrocyclohexane yield in an unexpected manner. In the multistage process it was found that the addition of nitric oxide to the stages beyond the first stage does not result in any improvement, because the side reaction:

$$C_6H_{12} + 18NO_2 \rightarrow 6CO_2 + 6H_2O + 18NO$$

generates additional amounts of nitric oxide for the succeeding steps. Since in the process of the present invention the improved yield of the desired product results in part from minimizing the side reactions, additional small amounts of nitric oxide added to the nitrating agent which is added to the reaction mixture in the successive stages may result in additional improvement.

The following Examples are given setting forth the best mode contemplated for carrying out the invention. It is to be understood that the invention is not limited to all details of the examples. Along with the examples some tests are shown further demonstrating the benefits of the invention.

*Example I*

A mixture of cyclohexane and nitrogen dioxide vapors, in a molar ratio of 1.5 to 1 was introduced at the rate of 1 lb./hr. at about 178° C. into a spherical glass reactor. The dimensions of the reactor were such that at the given feed rate, the mixture spent 42.5 seconds within the spherical reactor. The reactor was equipped with a flat single bladed paddle-type agitator of about 4" x 2½" size, adapted to thoroughly mix the gaseous contents of the reactor. The reactor was also provided with 7 thermocouples disposed randomly within the reactor space. The reactor was uniformly heated throughout from the exterior. The speed of the agitator was adjusted until the temperature indicated by each of the several thermocouples was the same, corresponding approximately to about 250 r.p.m. Several runs were conducted under these conditions in which only the temperature was varied. In each instance the sampling of the product was started only after the uniform temperature within the reactor was established. The following table sets forth the yield of monoitrocyclohexane at a variety of temperatures;

| Temperature, ° C.: | Yield, percent |
|---|---|
| 240 | 53.5 |
| 250 | 57.5 |
| 260 | 61.0 |
| 270 | 63.5 |
| 280 | 65.0 |
| 290 | 66.0 |
| 300 | 65.5 |
| 310 | 63.0 |
| 320 | 61.0 |
| 330 | 58.5 |
| 340 | 56.0 |
| 350 | 53.0 |
| 360 | 49.5 |

The optimum temperature in this instance was 290° C., at which point the yield of mononitrocyclohexane, based on reacted cyclohexane, was 66% and the conversion rate was 21%.

The procedure of the Example I was repeated, this time omitting the agitation of the reaction mixture. It was found that at about 290° C., without agitation the temperature uniformity within the reactor, after equilibrium conditions were arrived at, varied within a range of 5° C. Under these circumstances a yield of only 62.5% and a conversion of only 19.65% were obtained.

*Example II*

Cyclohexane was mixed with nitrogen dioxide under the conditions of Example I, except this time the dimensions of the reactor were such that the residence time of the introduced gases was 320 seconds. By adjusting the agitator speed within the reactor to provide a temperature uniformity within a range of 1° C., the following temperature-yield functions were obtained:

| Temperature ° C.: | Yield, percent |
|---|---|
| 220 | 62.0 |
| 230 | 67.0 |
| 240 | 73.0 |
| 250 | 78.0 |
| 260 | 81.0 |
| 270 | 81.0 |
| 280 | 79.5 |
| 290 | 76.0 |
| 300 | 71.0 |
| 310 | 65.0 |

As shown by the foregoing data, by the use of longer residence times, enabled by the present invention, improved yields can be obtained at lower temperatures than for shorter residence time at higher temperatures, for instance, as shown by Example I. In the present example, the maximum yield at 260° C. is 81.0% at a conversion rate of 24%. Consequently, also the absolute amount of nitro-cyclohexane obtained in the process of Example II was higher than that obtained in Example I.

*Example III*

Three reactors were connected in series, each being dimensioned to provide 46 seconds nominal residence time for the reaction mixture conducted thereto; the residence time-dictated dimensions being determined on the basis of the molar proportions and increments of the reactants introduced into the first reaction zone. The total residence time of the reactants within all three reactors was, on the above basis, a nominal 138 seconds. Each reactor was equipped with a number of thermocouples and an agitator. To the second and third stage reactors each the same amount of nitrogen dioxide used in the first stage (1 lb. per 1.5 lb. cyclohexane) was added. Mononitrocyclohexane was obtained in a yield of 66% and the conversion rate was 60%, at a reaction temperature of 274° C.

I claim:
1. In the mononitration of cyclohexane, wherein cyclohexane as a reactant is contacted with one or more of nitrogen dioxides, nitrogen tetroxide, and nitric acid nitrating agent as a co-reactant between 250° C. and 375° C., both cyclohexane and nitrating agent being essentially in the vapor phase, the improvement comprising intensely agitating the mixture of said reactant and co-reactant so as to maintain the temperature gradient within the mixture within a range of about 5° C.

2. The improvement of claim 1, wherein the contacting is carried out at elevated temperatures.

3. The improvement of claim 2, wherein the temperature gradient of the mixture is kept within a range of 1° C.

4. The improvement of claim 2, wherein cyclohexane is pre-mixed with one or more of nitrogen dioxide, nitrogen tetroxide, and nitric acid as nitrating agent at a temperature below that at which substantial nitration occurs and the ratio of cyclohexane to nitrating agent is above that which presents an explosion hazard.

5. The improvement of claim 4, wherein the mononitration is conducted in a single stage reaction.

6. In the multistage vapor phase mononitration between 250° C. and 375° C., of cyclohexane, wherein cyclohexane is contacted essentially in the vapor phase with one or more of nitrogen dioxide, nitrogen tetroxide, and nitric acid as nitrating agent essentially in the vapor phase at a temperature below that at which substantial nitration occurs, and wherein the contacted mixture of cyclohexane and nitrating agent is conducted through a plurality of reactors, and wherein an additional amount of nitrating agent is added to the reaction mixture exiting from a preceding reactor, the improvement comprising intensely agitating the reaction mixture in each reactor so as to maintain the temperature gradient within the reaction mixture in each reactor within a range of 5° C.

7. The improvement of claim 6, wherein the temperature gradient in each of said reactors is maintained within a range of 1° C. of the optimum reaction temperature of a particular reactor.

8. The improvement of claim 5, wherein said 5° C. range is maintained about the optimum temperature for the reaction and wherein the nitrating agent is nitrogen dioxide or nitrogen tetroxide.

9. The improvement of claim 6, wherein said 5° C. range is maintained about the optimum temperature for the reaction and wherein the nitrating agent is nitrogen dioxide or nitrogen tetroxide.

References Cited by the Examiner

UNITED STATES PATENTS 2,883,432  3/1959  Spaeth _____ 260—644
3,133,124  5/1964  Bonfield _____ 260—644

FOREIGN PATENTS 720,646  12/1954  Great Britain..

LEON D. ROSDOL, *Primary Examiner.*

REUBEN EPSTEIN, CARL D. QUARFORTH,
*Examiners.*

L. A. SEBASTIAN, *Assistant Examiner.*